(12) United States Patent
Hermawan

(10) Patent No.: US 8,720,372 B2
(45) Date of Patent: May 13, 2014

(54) WINDOW MOUNTED PET VIEWING SYSTEM

(76) Inventor: Herry Hermawan, San Bruno, CA (US)

( * ) Notice: Subject to any disclaimer, the term of this patent is extended or adjusted under 35 U.S.C. 154(b) by 154 days.

(21) Appl. No.: 13/400,052

(22) Filed: Feb. 18, 2012

(65) Prior Publication Data

US 2013/0213305 A1 Aug. 22, 2013

(51) Int. Cl.
*A01K 1/035* (2006.01)
*A01K 29/00* (2006.01)

(52) U.S. Cl.
USPC .......................... 119/28.5; 119/484; 160/127

(58) Field of Classification Search
USPC ......... 119/482, 452, 472, 473, 474, 475, 484,
119/485, 28.5; 160/95, 96, 97, 127, 135;
47/40, 68; 52/208, 79.5, 71, 63;
220/4.28, 6
See application file for complete search history.

(56) References Cited

U.S. PATENT DOCUMENTS

| | | | | |
|---|---|---|---|---|
| 268,968 | A | | 12/1882 | Willie |
| 324,291 | A | * | 8/1885 | Bennett ...................... 211/88.03 |
| 355,370 | A | | 1/1887 | Barlow |
| 2,414,592 | A | * | 1/1947 | Garlinski ........................ 160/91 |
| 2,520,625 | A | | 8/1950 | Dean |
| 2,574,423 | A | | 11/1951 | Sweeney |
| 2,981,256 | A | * | 4/1961 | Besnah ........................... 607/95 |
| 3,258,874 | A | | 7/1966 | Martin |
| 3,789,821 | A | * | 2/1974 | Fick et al. ....................... 126/38 |
| 5,351,673 | A | * | 10/1994 | Somerton ................. 126/214 D |
| 5,890,455 | A | | 4/1999 | Donchey |
| 6,165,065 | A | | 12/2000 | Pasij |
| 6,253,711 | B1 | | 7/2001 | Shibles |
| 6,866,035 | B2 | * | 3/2005 | Haemerle ................. 126/214 D |
| 6,944,990 | B2 | | 9/2005 | Noyes |
| 7,178,482 | B1 | * | 2/2007 | Derrick ......................... 119/484 |
| D557,867 | S | * | 12/2007 | Northrop ..................... D30/161 |
| D561,955 | S | | 2/2008 | McDonough |
| 7,530,331 | B1 | | 5/2009 | Malachowski |
| D653,058 | S | * | 1/2012 | Roberts ......................... D6/491 |
| 2004/0113796 | A1 | | 6/2004 | Noyes |
| 2007/0163512 | A1 | | 7/2007 | Di Angelo et al. |
| 2009/0084326 | A1 | | 4/2009 | Watzke |
| 2010/0043719 | A1 | | 2/2010 | Mercier |
| 2010/0170643 | A1 | | 7/2010 | DeFrance et al. |
| 2010/0282181 | A1 | | 11/2010 | Turner |

* cited by examiner

*Primary Examiner* — Rob Swiatek
*Assistant Examiner* — Ebony Evans
(74) *Attorney, Agent, or Firm* — Fidel D. Nwamu

(57) ABSTRACT

A window-mounted pet viewing system. The system includes at least one base panel having a base and a front portion. The one or more base panels are detachably mounted on a windowsill. When the one or more base panels are mounted, a pet can remain on the windowsill when a curtain mounted on the window area is let down.

9 Claims, 4 Drawing Sheets

WINDOW MOUNTED PET VIEWING SYSTEM

BACKGROUND OF THE INVENTION

The present invention relates generally to window-mounted pet viewing systems and more specifically to window-mounted pet viewing systems enabling pets to remain on windowsills.

Some pets such as felines in particular love to sit on window sills. Such pets often climb on the windowsill and remain there for long durations of time, observing and viewing passersby through the window.

During the day time, pets can remain on the ledges to enjoy the view because the window curtains or drapes are up since privacy can be maintained and passersby cannot observe the interior of the home.

However, at night, the curtains or window shades or drapes must be let down so as to maintain privacy in the home. Once such curtains are let down, then such felines must dismount and can no longer remain on the windowsill as the windowsill area is now occupied by the curtains, drapes and the like.

There is a need to address one or more of the foregoing disadvantages of conventional systems and methods, and the present invention meets this need.

BRIEF SUMMARY OF THE INVENTION

Various aspects of a window-mounted pet viewing system can be found in exemplary embodiments of the present invention.

In a first embodiment, the system includes a first substantially flat base panel. This base panel can be placed upright on a window sill. The back edge is placed against a window area while the bottom edge area is placed on the window sill.

The base panel has a front portion that is contiguous and preferably perpendicular with the side edge of the base panel. The second base panel is essentially congruent with the first and is oppositely disposed to the first base panel on the window sill. In this manner, a pet area between the window and the front portion of the base panels is formed, the base panels diverting a curtain mounted on the window area and permitting pets to remain on the windowsill when the curtain is let down.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

Figure 1:
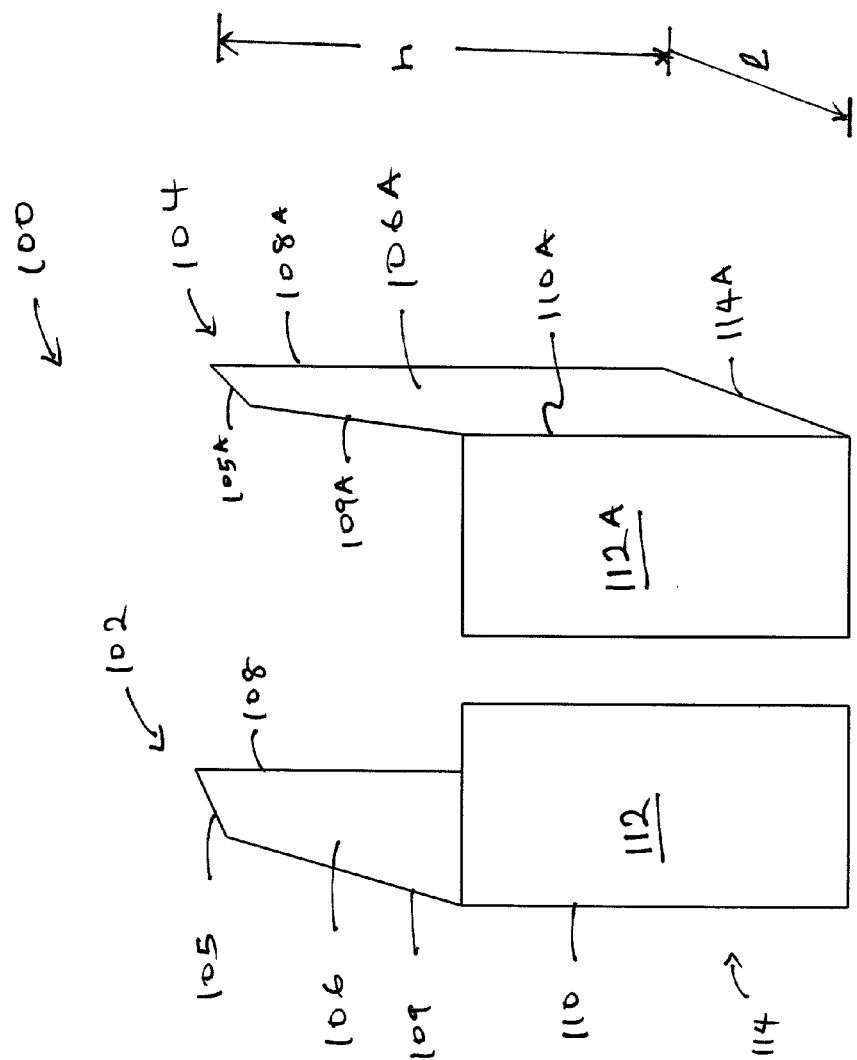
FIG. 1 illustrates a pet viewing system according to an exemplary embodiment of the present invention.

FIG. 1 illustrates pet viewing system 100 according to an exemplary embodiment of the present invention.

In FIG. 1, pet viewing system 100 is mountable on a windowsill allowing pets to remain therein for extended durations. Among other components, pet viewing system 100 comprises left panel 102 and right panel 104. Panels 102 and 104 are essentially congruent and are oppositely disposed to each other.

Specifically, left panel 102 can be placed on a left area of the windowsill upright and against a window area; similarly, right panel 104 is disposed oppositely be placing it on a right area of the windowsill upright and against the window area.

Left panel 102 might itself comprise base 106 and front portion 112 as shown. Base 106 is configured to support the weight of a drape, curtain or window blind and is adapted to divert said drape, curtain or window blind from the window area. Base 106 comprises sturdy material such as polymer, high density cardboard, etc., to withstand the curtain weight.

As shown, base 106 has a height h (see base 104) that is a substantial length of a window height. Here, base 106 includes top edge 105, front edge 110 and back edge 108. Base 106 also includes a bottom edge (not shown) analogous to bottom edge 114A of base 104.

Front portion 112 of left panel 102 is also shown in FIG. 1. Here, front portion 112 is contiguous with front edge 110. In one embodiment shown in FIG. 1, front portion 112 and base 116 are perpendicular. However, one skilled in the art will realize that this is but an example and base 116 and front portion 112 can be aligned as consistent with the spirit and scope of the present invention.

Now describing the right panel 104, which comprises base 106A and back edge 108A. Right panel 104 also comprises top edge 105A, front edge 110A and bottom edge 114A. As previously noted, right panel 104 and left panel 102 are essentially congruent. Right panel 104 also includes front portion 112A that is contiguous with front edge 110A.

As can be seen, upper portion 109 of front edge 110 tapers upwardly towards top edge 105 and inwardly towards that edge 108. Similarly, the upper portion 109A of front edge 110A tapers upwardly towards top edge 105A and inwardly towards back edge 108A.

Figure 2:
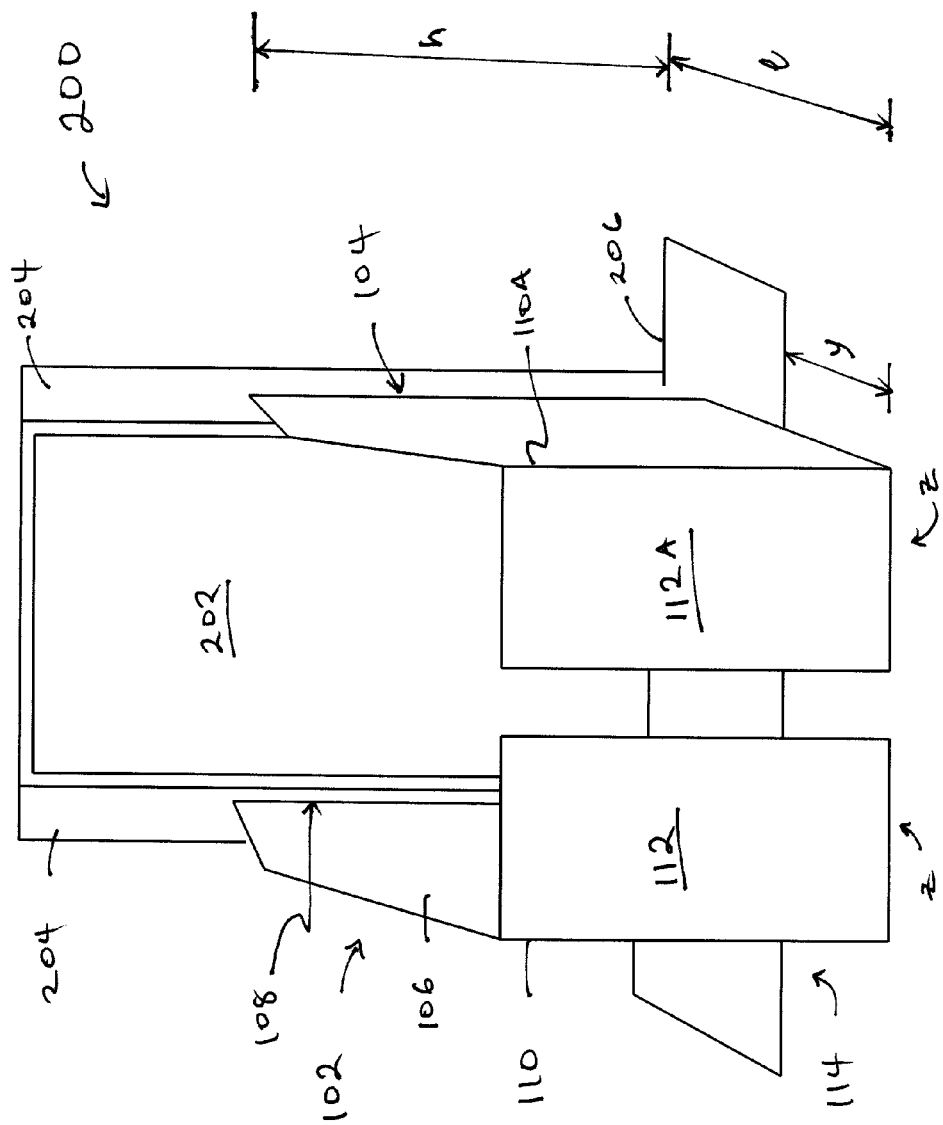
FIG. 2 illustrates the pet viewing system of FIG. 1 mounted against a window area according to an exemplary embodiment of the present invention.

FIG. 2 illustrates pet viewing system 100 of FIG. 1 mounted against window area 200 according to an exemplary embodiment of the present invention.

In FIG. 2, window area 200 includes window 202 and window frames 204. Window area 200 also includes windowsill 206. Window are 202 further includes a curtain 302 (shown in FIG. 3). Note that the curtain (blind, drape, or other window covering) is not shown in FIG. 2 so as to not unnecessarily obscure understanding of the present invention.

In use, a user begins by mounting left panel 102 against window area 200 as shown. As can be seen, the area around bottom edge 114 is first mounted on windowsill 206. The mounting might be secured by any detachable fastener known to those skilled in the art. Contemporaneously, the area around back edge 108 is mounted against window frame 204.

For stability, the mounting may also be securely attached by a detachable fastener. Thus, left panel 102 is mounted such that back edge 108 is resting or is flush against window frame 204 of window area 200.

The same process is similarly carried out on the right side of window area 204. The area around bottom edge 114A is first mounted on windowsill 206. The mounting might be secured by any detachable fastener known to those skilled in the art. Contemporaneously, the area around back edge 108A is mounted against window frame 204.

For stability, the mounting may also be securely attached by a detachable fastener. Thus, left panel 104 is mounted such that back edge 108A is resting or is flush against window frame 204 of window area 200.

Front portions 112, 112A provide privacy to the inside of the home and also enclose the space between window 202 and the front portions. This enclosed space is where the pet lays to enjoy the view.

It should be observed that the length y, the distance from the front edge of windowsill 206 to front edge 110 (front portion 112A) is preferably at least 4 inches. In this manner, pets have sufficient room for egress (direction z) from underneath into the enclosure and lie on windowsill 206 to enjoy the view. Once both panels are in place, curtain 302 of FIG. 2 can then be let down in the direction indicated by arrow m as further illustrated in FIG. 3.

Figure 3:
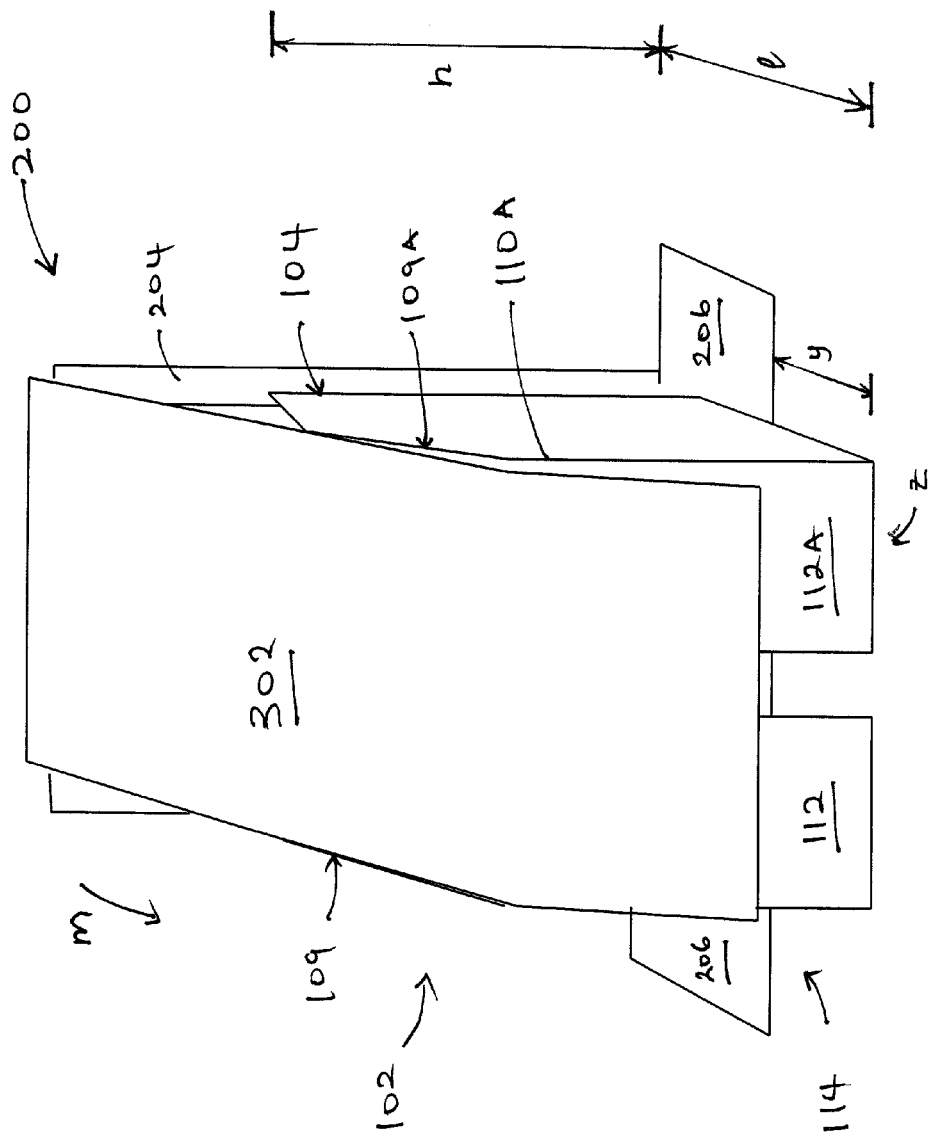
FIG. 3 illustrates the pet viewing system 100 of FIG. 2 with the curtain let down according to an exemplary embodiment of the present invention.

FIG. 3 illustrates pet viewing system 100 of FIG. 2 with curtain 302 let down according to an exemplary embodiment of the present invention.

As can be seen, panels 102 and 104 divert curtain 302 away from the window area 200. In this manner, a feline can remain on the windowsill 206 without curtain 302 hampering or disturbing the feline's view. Moreover, privacy is provided by the panels 102 and 104 so passersby looking in through the streets cannot see into the home.

Note that surface 109 and 109A previously mentioned are tapered and thus provide a gently sloping surface or area for receiving curtain 302. A feline can safely remain on windowsill 206 all night until daylight when curtain 302 can be drawn up again. Once that happens, panels 102 and 104 can simply be removed and stored away as further described with reference to FIG. 4 and FIG. 5.

Figure 4:
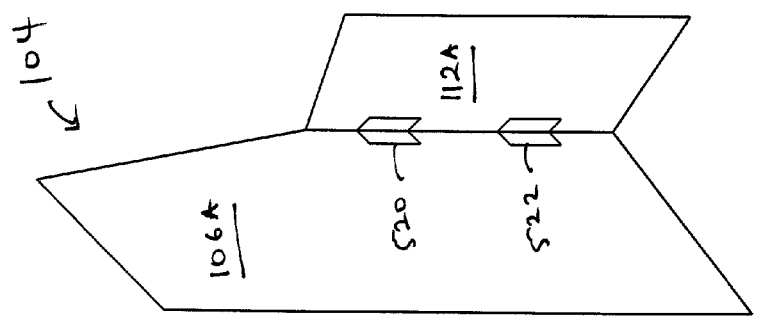
FIG. 4 shows the interior of the right panel of FIG. 1 according to an exemplary embodiment of the present invention.

FIG. 4 shows the interior of right panel 104 according to an exemplary embodiment of the present invention.

In FIG. 4, at least two hinges 520 and 522 attach front portion 112A and base 106A. In this manner, front portion 112A can be collapsed so that it is in direct contact with base 106A. By so doing, efficient storage and stowing of the panels are facilitated.

Figure 5:
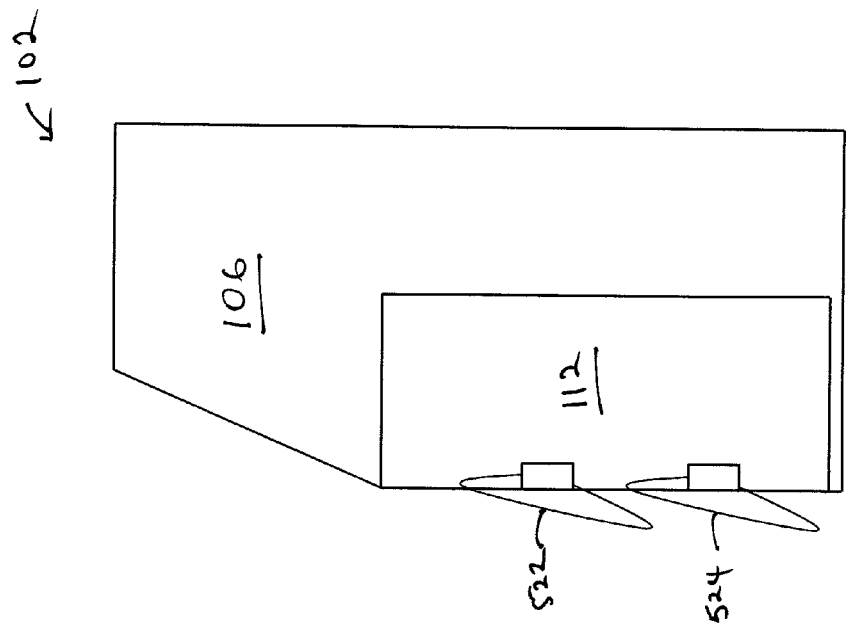
FIG. 5 shows a collapsed panel according to an exemplary embodiment of the present invention.

FIG. 5 shows a collapsed panel according to an exemplary embodiment of the present invention.

Specifically, left panel 102 is shown with front portion 112 completely collapsed against base 106. Note that left panel 102 (and right panel 104) includes ties 522 and 524 on the exterior surface adjoining front portion 122 and base 106. In this manner, tie 522 and tie 524 can be utilized for strapping around the collapsed panel for storage purposes.

While the above is a complete description of exemplary specific embodiments of the invention, additional embodiments are also possible. For example, it is contemplated that the enclosure between the window and the front portions of the panels may be used for plants and other like items. Thus, the above description should not be taken as limiting the scope of the invention, which is defined by the appended claims along with their full scope of equivalents.

I claim:

1. A window viewing system comprising:
a first panel bounded by a top and a bottom edge and a front and a back edge, said first panel being placed upright against a window area by resting a bottom edge area on a window sill and a back edge area along the window area, said front edge including a lower front edge and an upper front edge, the upper front edge tapers upwardly toward the top edge and inwardly toward the back edge, said upper front edge forming a surface area diverting a window covering from said window area to create a space between the window covering and a window, the space for use by a pet, said first panel also having a first front cover contiguous with and sharing a boundary with the entirety of the lower front edge of said first panel, said front cover having a width extending from the lower front edge to a position that is generally midway of said window sill, said first front cover being sized to have the same height as the lower front edge, said first front cover configured to provide privacy to an interior of a room and enclosing the space between the window covering and the window;
a second panel bounded by a top and a bottom edge and a front and a back edge, said second panel being placed upright against a window area by resting a bottom edge area on the window sill and a back edge area along the window area, said front edge including a lower front edge and an upper front edge, the upper front edge tapers upwardly toward the top edge and inwardly toward the back edge of the second panel, said upper front edge forming a surface area diverting the window covering or the like from said window area to create said space between the window covering and the window, the space configured for use by a pet, said second panel having a second front cover contiguous with and sharing a boundary with the entirety of the lower front edge of said second panel, said second front cover having a width extending from the lower front edge of the second panel to a position that is generally midway of said window sill, said second front cover being sized to have the same height as the lower front edge of the second panel; and
wherein each of the width of said first front cover and said second front cover are sized to leave a gap between the first front cover and second front cover, said second front cover along with said first front cover configured to provide privacy to the interior of said room and enclosing the space between the window covering and the window.

2. The system of claim 1 said first panel is a left panel and said second panel is a right panel, said left and right panel placed simultaneously on the window sill, said left panel diverting a left side of the window covering while the right panel diverts a right side of the window covering.

3. The system of claim 1 wherein said first panel and said first front cover are perpendicular.

4. The system of claim 1 wherein said second panel and said second front cover are perpendicular.

5. The system of claim 1 wherein said first panel and said first front cover are hingedly attached and can be collapsed against each other for storage.

6. The system of claim 1 wherein said second panel and said second front cover are hingedly attached and can be collapsed against each other for storage.

7. A pet window viewing system comprising:
a base panel placed upright on a window sill, said base panel being bounded by a front edge and a back edge and a bottom edge area, said back edge being placed against a window area and said bottom edge area is placed on the window sill, said base panel having a length from the back edge to the front edge, said length being at least 4 inches longer than that of the window sill upon which said base panel is rested forming a pet egress between a window sill edge and the back edge of the base panel, said base panel also having a front cover contiguous with and sharing a boundary with a substantial portion of the front edge, said front cover having a width extending from the front edge to a position that is generally midway of said window sill, said front cover being sized to have the same height as the front edge, said front cover providing privacy to an interior of a room.

8. The system of claim 7 wherein said front cover and said base panel are perpendicular.

9. The system of claim 8 wherein said front cover can be hingedly collapsed against said base panel for storage.

\* \* \* \* \*